United States Patent [19]

Binns

[11] 4,089,249
[45] May 16, 1978

[54] HOLE FILLING BLIND RIVET

[76] Inventor: Lloyd S. Binns, 10220 Warner Ave., Fountain Valley, Calif. 92708

[21] Appl. No.: 727,287

[22] Filed: Sep. 27, 1976

[51] Int. Cl.² .................................. F16B 13/06
[52] U.S. Cl. .................................. 85/72; 85/77
[58] Field of Search .......... 85/77, 78, 72, 75, 74, 85/73, 7

[56] References Cited

U.S. PATENT DOCUMENTS

| | | | |
|---|---|---|---|
| 2,114,493 | 4/1938 | Huck | 85/78 X |
| 2,372,222 | 3/1945 | Mullgardt | 85/78 |
| 2,955,504 | 10/1960 | Lovrinch et al. | 85/75 X |
| 3,390,601 | 7/1968 | Summerlin | 85/78 |
| 3,414,965 | 12/1968 | Stau et al. | 85/77 X |
| 3,489,056 | 1/1970 | Blakeley | 85/78 |
| 3,880,042 | 4/1975 | Binns | 85/77 X |
| 3,915,055 | 10/1975 | Binns | 85/77 |
| 3,937,123 | 2/1976 | Matuschek | 85/77 X |

Primary Examiner—Ramon S. Britts
Attorney, Agent, or Firm—Spensley, Horn & Lubitz

[57] ABSTRACT

In this blind rivet, the sleeve is counterbored from the rear end, and has interior axial splines forward of the counterbore. The bulb-forming lugs project laterally from a shoulder portion of the mandrel that has a diameter sufficiently great to collapse the sleeve splines during rivet installation. Between the bulb-forming lugs and the mandrel blind end are a set of annular flutes in the mandrel. During rivet installation these flutes urge radial expansion of the sleeve counterbore region to assist hole filling. The sleeve may include a lock-collar-guiding counterbore having an annular convex region providing a locking collar entry resistance surface effective during the initial phase of rivet installation.

8 Claims, 7 Drawing Figures

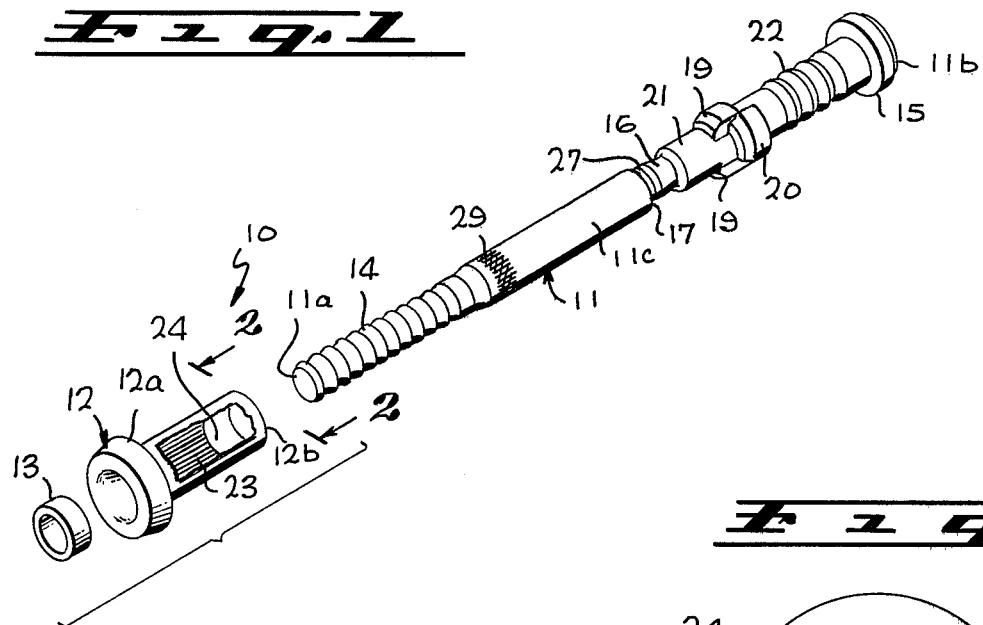
Fig. 1
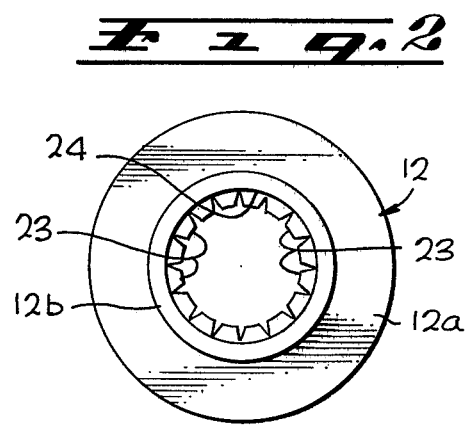
Fig. 2
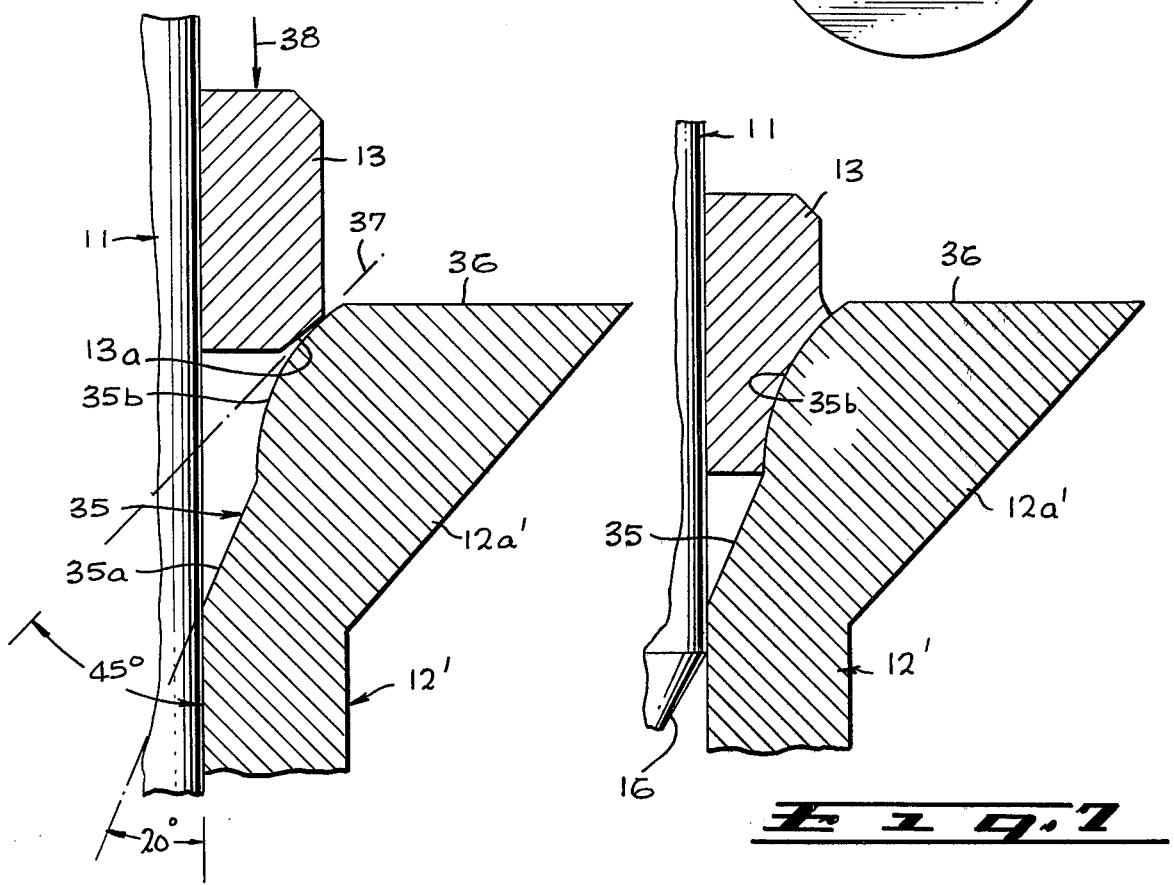
Fig. 6
Fig. 7

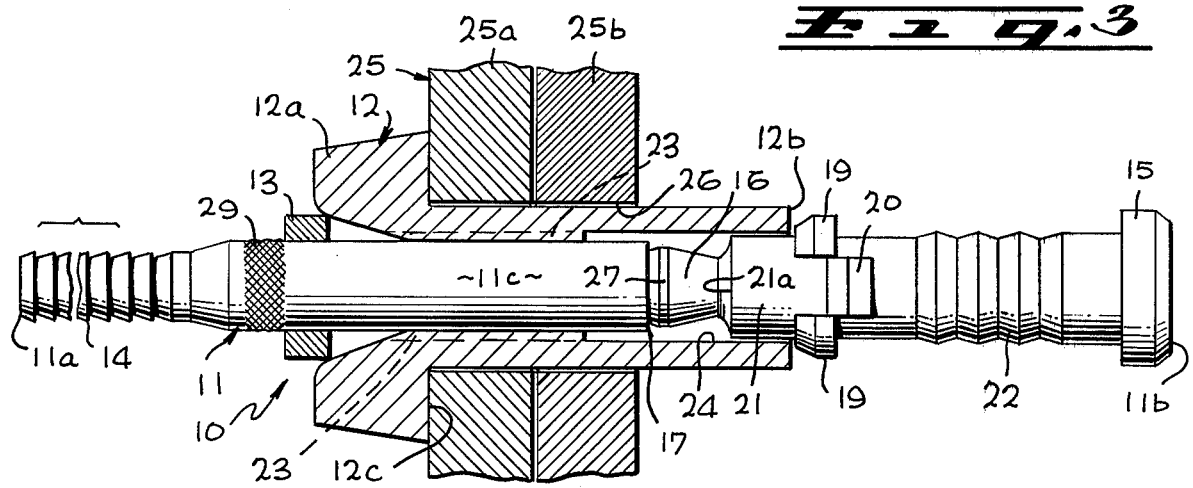
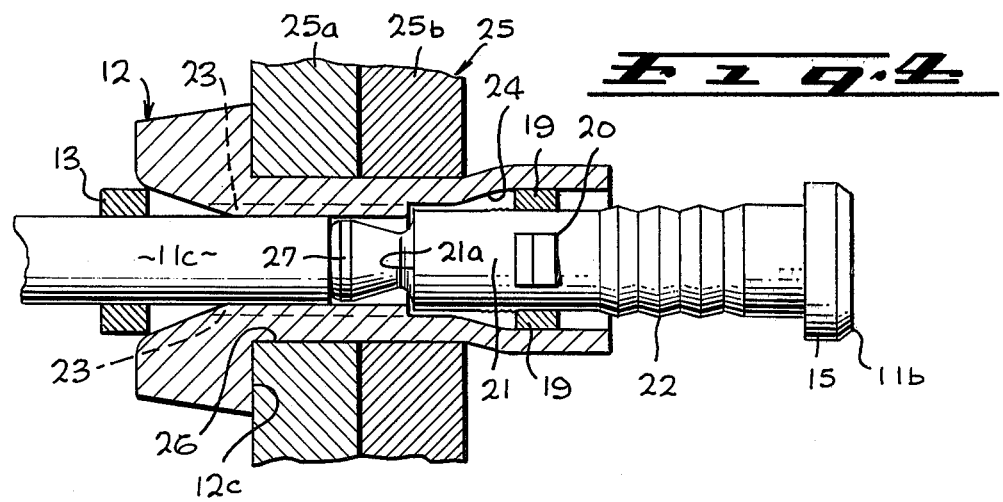
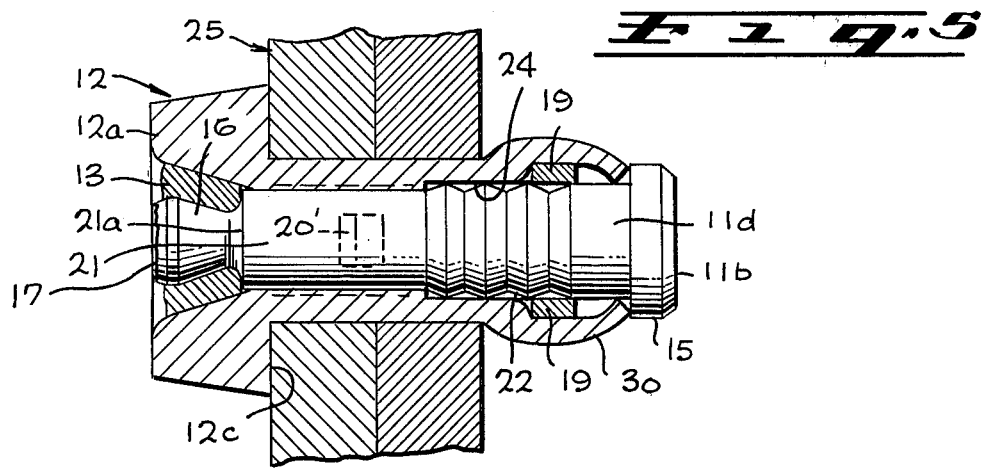

HOLE FILLING BLIND RIVET

BACKGROUND OF THE INVENTION

1. Field of the Invention

The present invention relates to a hole filling blind rivet.

2 Description of the Prior Art

Blind rivets are widely used in fastening applications where one side of the workpiece is inaccessible. Typically the blind rivet includes a mandrel (also called a stem or spindle) and a surrounding rivet sleeve or body which together are inserted through a hole in the workpiece. The exposed end of the mandrel has shallow annular grooves engaged by a riveting tool equipped with a pulling head. As the mandrel is pulled, the inserted end of the mandrel mechanically expands the sleeve against the inaccessible side of the workpiece. Meanwhile a conical groove on the mandrel is translated toward a complimentary surface provided in the manufactured head of the sleeve. At the instant that these two interacting surfaces mate to provide sufficient opening, a collar is driven into the void. The mandrel is now incapable of either forward motion by continued pulling or recoil when it snaps at a predetermined breaknotch. Sleeve, mandrel and collar now become a secure unit imparting strength to the joint.

In the inventor's U.S. Pat. No. 3,880,042 there is disclosed a blind rivet in which sets of lugs are mutually radially and axially offset. As the mandrel is pulled, these sets of lugs expand the sleeve in a radially nonuniform pattern to form a bulb at the blind surface of the workpiece.

One embodiment of the rivet shown in that U.S. Pat. No. 3,880,042 was intended as a hole-filling bllind rivet. The objective was to provide a rivet which would eliminate any gap between the installed sleeve and the hole in the workpiece through which the rivet was inserted. In that embodiment, a portion of the mandrel between separated sets of lugs was geometrically configured with a maximum diameter slightly greater than the inner diameter of the sleeve. As the mandrel was pulled during rivet installation, the first set of lugs sheared and translated axially rearwardly along the mandrel. Subsequent to the shearing of the first set of lugs, the enlarged diameter mandrel portion urged radially expansion of the sleeve to accomplish hole filling. Thereafter, the second set of lugs completed bulb formation by radially expanding the sleeve in different sectors than those expanded by the first set of lugs.

An object of the present invention is to provide an improved type of hole filling blind rivet.

In the inventor's U.S. Pat. No. 3,915,055, there is a disclosed a blind rivet having a counterboard sleeve head of double-angle configuration. Using such a counterbored sleeve head permitted the blind rivet to be installed with a non-shifting pulling head such as that disclosed in the inventor's U.S. Pat. No. 3,850,021. During the initial phase of rivet installation, the locking collar pressed against the outer conical surface of the sleeve counterbore. This surface defined a relatively shallow locking collar entry resistance angle, so that most of the force of the pulling head was exerted in a direction axially of the mandrel, so as to obtain most efficient installation. During a subsequent phase of the installation, the inner conical surface of the sleeve counterbore was aligned with the locking groove in the mandrel. This facilitated guiding insertion of the locking collar into the groove.

Another object of the present invention is to provide an improved type of sleeve counterbore configuration for reception of the locking collar.

SUMMARY OF THE INVENTION

These and other objectives are achieved by providing a blind rivet in which the sleeve has axial splines along the forward portion of its interior. The rear interior portion is of slightly larger diameter and has no splines. The mandrel has a shoulder portion with a diameter sufficiently great to cause collapse of the sleeve splines during rivet installation. The bulb-forming lugs project laterally from this shoulder. Between the bulb-forming lugs and the mandrel blind end are a set of annular flutes. During rivet installation, these flutes urge radial expansion of the unsplined sleeve region to assist hole filling. The axial arrangement and dimensions of the shoulder, lugs and annular flutes ensures that bulb formation begins prior to spline collapse and radial hole-filling expansion of the rivet sleeve.

The rivet sleeve may include a lock-collar-guiding counterbore having an annular convex region. A portion of this convex region provides a locking collar entry resistance surface against which the locking collar is forced during the initial phase of rivet installation.

BRIEF DESCRIPTION OF THE DRAWINGS

A detailed description of the drawings will be made with reference to the accompanying drawings wherein like numerals designated corresponding parts in the several figures.

FIG. 1 is a perspective view showing the three components of a preferred embodiment of the inventive blind rivet. The rivet sleeve is shown broken away to expose the splined and unsplined sections of its interior.

FIG. 2 is a transverse sectional view of the rivet sleeve as seen along the line 2—2 of FIG. 1.

FIGS. 3, 4 and 5 are transverse sectional views showing installation of the inventive blind rivet respectively at the beginning, middle and end of the installation cycle.

FIGS. 6 and 7 are fragmentary sectional views showing a rivet sleeve configuration which presents a locking collar entry resistance surface during the initial phase of rivet installation.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention is best defined by the appended claims.

Operational characteristics attributed to forms of the invention first described also shall be attributed to forms later described, unless such characteristics obviously are inapplicable or unless specific exception is made.

Referring to FIGS. 1, 2 and 3, the inventive blind rivet 10 includes a mandrel 11 which slidingly receives a rivet sleeve 12 and an annular locking collar 13. The forward end 11a of the mandrel 11 is provided with shallow annular grooves 14 for engagement by the pulling head (not shown) of a conventional rivet installation tool. At the other, "blind" end 11b of the mandrel 11, there is provided a laterally extending stop ring 15. The mandrel 11 also includes a locking groove 16 which receives the locking collar 13, and a break notch 17 which aids breakoff of the mandrel 11 when installation is complete.

Non-uniform radial expansion and bulb formation of the rivet sleeve 12 is accomplished by two sets of lugs 19, 20. These project laterally from a shoulder portion 21 of the mandrel 11 rearward of the locking groove 16. Advantageously, but not necessarily, the lugs 19 and 20 are mutually axially and radially offset, so as to provide radially non-uniform expansion of the sleeve 12, as described in the above-mentioned U.S. Pat. No. 3,880,042. Between the lugs 19, 20 and the stop ring 15, the mandrel 11 is provided with a set of annular flutes 22. As described below, these assist in the radial hole-filling expansion of the sleeve 12.

The sleeve 12 includes a head 12a. As best seen in FIGS. 1 and 2, the interior region of the sleeve 12 just rearward of the head 12a is provided with generally axially aligned splines 23. The sleeve 12 may be counterbored from the rear end 12b to provide a smooth, unsplined interior surface region 24. This smooth region 24 has an inner diameter greater than that of the splines 23.

The mandrel 11 may have a knurled section 29 to keep the rivet sleeve 12 and locking collar 13 in place on the mandrel prior to rivet installation.

FIG. 3 shows the assembled rivet 10 at the beginning of installation in a workpiece 25. This workpiece consists of two separate sheets 25a, 25b that are to be clinched together by the rivet 10. The rivet sleeve 12 and the blind end 11b of the mandrel 11 have been inserted through a hole 26 in the workpiece 25. The flat undersurface 12c of the rivet head 12a abuts against the outer surface of the workpiece 25. The locking collar 13 surrounds the mandrel 11. If a non-shifting installation tool is used, such as that disclosed in the above-referenced U.S. Pat. No. 3,850,021, the tool anvil force will be exerted against the locking collar 13 as the installation tool pulls the mandrel 11 towards the left as viewed in FIG. 3 to accomplish installation.

As the installation cycle begins, the forward set of lugs 19 engages the rear end 12b of the sleeve 12 and begins to flare out this sleeve in a radially non-uniform manner, as illustrated in FIGS. 3 and 4. In quick succession the rearward pair of lugs 20 accomplish similar function and all four lugs progressively deepen the flaired tail of the sleeve to abut against the workpiece. At this instant the forward pair of lugs shear off from the mandrel and are translated rearward to the same plane as the rear lugs which also immediately shear so that all four lugs are translated rearwardly together.

The mandrel 11 is dimensioned so that the portion 11c forward of the break notch 17 has a diameter which forms either a snug or clearance fit with the interior of the splines 23 on the sleeve 12. The region 27 between the break notch 17 and the locking groove 16 has a diameter slightly less than that of the region 11c. However, the shoulder portion 21 of the mandrel 11 has a diameter which is greater than the inner diameter of the splines 23 but less than the diameter of the sleeve smooth region 24. Thus, as the mandrel 11 is pulled through the sleeve 12 during rivet installation, the forward edge 21a of the mandrel shoulder 21 (FIG. 4) will engage the splines 23. Advantageously, this engagement occurs only after the lugs 19 and 20 are sheared from the mandrel 15. As the pulling continues, the mandrel shoulder portion 21 collapses the splines 23 so as to completely fill the space between the mandrel 11 and the sleeve 12. The force exerted on the splines 23 by the shoulder 21 also urges radial expansion of the sleeve 12 itself thereby forcing the sleeve into contact with the workpiece 25 to fill the hole 26.

The annular flutes 22 have a maximum outer diameter that is just slightly greater than the inner diameter of the unsplined sleeve portion 24. Thus, as the mandrel 11 is pulled through the sleeve 12, the flutes 22 come into contact with the surface 24 and urge the radial expansion of this portion of the sleeve 12. Advantageously, the flutes 22 force the unsplined portion of the sleeve 24 into contact with the workpiece 25 so as to aid filling of the hole 26.

Note that during rivet installation, the lugs 19, 20 will translate rearwardly past the flutes 22. When installation is complete, (FIG. 5) the lugs 19, 20 will be situated about the region 11d of the mandrel 11 as shown in FIG. 5. The original position of one lugs 20 is indicated by the phantom line 20'. The lugs 19, 20 will have formed a bulb 30 which cooperates with the rivet head 12a to clinch together the workpiece sheets 25a and 25b. Upon completion of rivet installation, the mandrel shoulder section 21 lies within the splined region 23 of the sleeve 12, and the flutes 22 lie within the smooth region 24 of the sleeve 12. Advantageously, the length of the shoulder region 21 between the locking groove 16 and the beginning of the flutes 22 is proportional to the length of the unsplined counterbore 24 in the sleeve 12. With that arrangement, hole-filling radial expansion of the sleeve 12 takes place by the concurrent compression of the splines 23 by the shoulder 21 and radial expansion of the sleeve portion 24 by the flutes 22.

At the end of rivet installation, the stop ring 15 abuts against the rear edge 12b of the sleeve 12 to complete the formation of the bulb 30. The locking ring 13 is forced within the groove 16, and the mandrel is broken away at the break notch 17, as shown in FIG. 5.

Referring now to FIGS. 6 and 7, there is shown an optional embodiment of the rivet sleeve 12'. The rivet head 12a' is provided with a counterbore 35. The counterbore is generally formed at approximately a 20° angle from the sleeve axis. The inner portion 35a of the counterbore 35 is smooth and conical at this angle. In the region between the inner conical section 35a and the exterior surface 36 of the rivet head 12a', the counterbore 35 is provided with an annular convex region 35b. Typically, a line 37 tangential to the annular convex surface 35b near the outer face 36 forms an angle of about 45° with the axis of the rivet sleeve 12.

During the initial phase of rivet installation, the locking collar 13 impinges against the annular convex surface 35b, as illustrated in FIG. 6. The collar 13 may include a chamfered edge 13a to increase the area of surface contact between the locking collar 13 and the rivet 12.

As the tool anvil force is exerted on the locking collar 13 in the direction of the arrow 38 (FIG. 6), a substantial component of this force is exerted parallel to the axis of the rivet 12, via the locking collar 13 and the locking collar entry resistance surface 35b. Effective rivet installation is accomplished. As the installing force continues, the locking collar 13 flows or is forced into the counterbore 35 and eventually into the locking groove 16 as this groove becomes aligned with the counterbore 35 near the end of the rivet installation cycle.

Intending to claim all novel, useful and unobvious features, shown or described, the inventor claims:

1. In a blind rivet of the type having a sleeve and a mandrel, the improvement wherein:

said mandrel has one or more laterally projecting sleeve expanding lugs all situated at locations spaced from the rear end of said mandrel and being frangibly connected thereto, and a set of annular flutes on said mandrel between said lug locations and said mandrel rear end, the outer diameter of said flutes being slightly larger than the inner diameter of said sleeve, so that during installation said lugs will expand said sleeve, will shear from said mandrel and will translate axially past said flutes toward said mandrel rear end, said flutes then urging radial expansion of said rivet sleeve to accomplish hole filling, and wherein:

the interior of said sleeve is counterbored from the rear end thereof, said flute outer diameter being slightly larger than the inner diameter of said sleeve counterbored portion, the interior of said sleeve forward of said counterbored portion having generally axially aligned, readily deformable splines with an inner diameter less than that of said counterbored portion, said mandrel having an annularly continuous shoulder forward of said flutes, the outer diameter of said shoulder being greater than said inner diameter of said spines, said lugs all projecting laterally from said shoulder, said shoulder collapsing said splines during rivet installation as said flutes urge expansion of the counterbored portion of said sleeve.

2. A blind rivet according to claim 1 wherein said shoulder has a forward end, the maximum outer diameter of said mandrel forward of said shoulder being less than said shoulder outer diameter, said lugs being axially spaced rearwardly of said shoulder forward end by a distance less than the depth of said sleeve counterbore portion, so that during rivet installation said lugs will begin radial expansion of said rivet sleeve prior to engagement and collapse of said splines by said shoulder.

3. In a blind rivet of the type having a rivet sleeve and a separate mandrel extending through said sleeve, one end of said mandrel being adapted for engagement by a pulling tool, said mandrel having a set of bulb-forming lugs projecting laterally from locations spaced from the other, blind end thereof and frangibly connected thereto, the improvement wherein:

said rivet sleeve has a set of readily deformable splines along an interior portion thereof, and wherein said mandrel has an annularly continuous shoulder portion from which said lugs project, said shoulder portion extending forwardly of said lugs, the diameter of said shoulder portion being greater than the inner diameter of said splines so as to collapse said splines as said shoulder portion is pulled through the splined portion of said sleeve during rivet installation, the remainder of said mandrel forward of said shoulder portion having a smaller diameter the distance between the forward edge of said shoulder portion and the nearest lug being less than the distance between the end of said splines and the rear end of said sleeve, so that as said mandrel is pulled axially through said sleeve during rivet installation, said lugs will complete the bulb-forming expansion of said sleeve prior to shearing of said lugs and collapsing of said splines by said shoulder portion.

4. A blind rivet according to claim 3 wherein said sleeve interior has an unsplined region rearward of said splines, said unsplined region having a larger diameter than the inner diameter of said splines, said mandrel also having a set of annular flutes situated between said lugs and said mandrel blind end, the outer diameter of said flutes being slightly greater than the inner diameter of said sleeve unsplined region, so that during rivet installation said mandrel shoulder portion will collapse said splines and said flutes concurrently will urge radial expansion of the unsplined region of said rivet sleeve so as to accomplish hole filling.

5. A blind rivet according to claim 4 wherein said mandrel has a set of mutually radially and axially offset lugs all projecting laterally from said shoulder portion, said mandrel having an integrally formed peripheral ring at the blind end thereof, said annular flutes all being between the lugs nearest said blind end and said ring, said lugs shearing from said mandrel and translating axially toward said ring during rivet installation, the rear edge of said rivet sleeve abutting against said ring at the completion of rivet installation.

6. A blind rivet according to claim 5 wherein the said distance between the end of said shoulder portion nearest said mandrel one end and the first of said lugs to engage said sleeve during installaton is less than the axial length of said unsplined region of said sleeve, so that during installation said lugs will complete expansion of said sleeve before said shoulder portion begins to collapse said splines.

7. A blind rivet according to claim 6 wherein the distance between the end of said shoulder portion nearest said mandrel one end and the first of said annular flutes is approximately equal to the axial length of said sleeve unsplined region, so that during installation said flutes will begin to urge radial hole filling expansion of said sleeve unsplined portion as said mandrel shoulder region begins to urge spline collapse and hole filling expansion of said rivet splined region.

8. A blind rivet according to claim 3 wherein said mandrel also includes a lock collar groove, said rivet including a lock collar, said sleeve including a counterbore disposed at an angle for guiding insertion of said lock collar into said groove, said counterbore having, adjacent its collar-receiving end, an annular convex region providing a locking collar entry resistance surface against which the locking collar presses during the initial phase of rivet installation.

* * * * *